(12) United States Patent
Wu et al.

(10) Patent No.: US 8,929,357 B2
(45) Date of Patent: Jan. 6, 2015

(54) METHOD, SYSTEM AND GATEWAY FOR SUPPLYING INTELLIGENT SERVICE

(75) Inventors: Yanyu Wu, Shenzhen (CN); Lin Lin, Shenzhen (CN); Peng Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 424 days.

(21) Appl. No.: 12/893,511

(22) Filed: Sep. 29, 2010

(65) Prior Publication Data

US 2011/0019663 A1  Jan. 27, 2011

Related U.S. Application Data

(63) Continuation of application No. PCT/CN2009/071045, filed on Mar. 27, 2009.

(30) Foreign Application Priority Data

Mar. 29, 2008 (CN) .......................... 2008 1 0066226

(51) Int. Cl.
| | | |
|---|---|---|
| H04L 12/66 | (2006.01) |
| H04M 7/12 | (2006.01) |
| H04Q 3/00 | (2006.01) |
| H04L 29/06 | (2006.01) |

(52) U.S. Cl.
CPC ............. *H04M 7/127* (2013.01); *H04Q 3/0029* (2013.01); *H04Q 3/0045* (2013.01); *H04L 65/103* (2013.01)
USPC ........... 370/352; 370/356; 370/355; 370/354; 370/328; 370/353

(58) Field of Classification Search
USPC ......................................... 370/352–356, 328
See application file for complete search history.

(56) References Cited

U.S. PATENT DOCUMENTS

| | | | |
|---|---|---|---|
| 7,203,301 B1 | 4/2007 | Mudd et al. |
| 7,564,870 B2 * | 7/2009 | Miller et al. | ................... 370/467 |
| 2004/0114730 A1 * | 6/2004 | Koch et al. | ......................... 379/9 |
| 2004/0219911 A1 * | 11/2004 | Kouchri et al. | ............... 455/423 |
| 2005/0135340 A1 * | 6/2005 | Lee et al. | ....................... 370/352 |

(Continued)

FOREIGN PATENT DOCUMENTS

| | | |
|---|---|---|
| CN | 1627737 A | 6/2005 |
| CN | 1774015 A | 5/2006 |
| CN | 1976377 A | 6/2007 |

(Continued)

OTHER PUBLICATIONS

2nd Office Action in corresponding Chinese Application No. 200810066226.6 (Jan. 26, 2011).

(Continued)

*Primary Examiner* — Khaled Kassim
(74) *Attorney, Agent, or Firm* — Leydig, Voit & Mayer, Ltd.

(57) ABSTRACT

An intelligent service system and method are provided. The method includes: receiving a calling information transmitted by a switching device through an Internet-protocol-based call control protocol and which carries the identification information of the service control function requested by the call as well as the identification information of the call; parsing the received calling information, and after the identification information of the service control function and the identification information of this calling are obtained, initiating an assist request to the service control device; receiving the resource operation instruction, and supplying service resource service accordingly; said instruction is sent out by the service control device after said device has received the assist request and according to the service requirement. The media stream leading to the media gateway is established through the media stream transport protocol based on the Internet protocol. The method simplifies the management and maintenance of the intelligent service network.

13 Claims, 7 Drawing Sheets

(56) References Cited

U.S. PATENT DOCUMENTS

| | | | |
|---|---|---|---|
| 2007/0133782 A1* | 6/2007 | Zhu | 379/265.09 |
| 2007/0206569 A1* | 9/2007 | Silver et al. | 370/352 |
| 2007/0268858 A1* | 11/2007 | Soto | 370/328 |
| 2009/0017786 A1* | 1/2009 | Mo et al. | 455/405 |
| 2010/0080373 A1* | 4/2010 | Reynolds et al. | 379/142.04 |

FOREIGN PATENT DOCUMENTS

| | | |
|---|---|---|
| CN | 101094088 A | 12/2007 |
| EP | 1592217 A1 | 11/2005 |
| WO | 0172008 A3 | 9/2001 |

OTHER PUBLICATIONS

Extended European Search report in corresponding European Application No. 09727763.6 (Mar. 28, 2011).

Written Opinion of the International Searching Authority in corresponding PCT Application No. PCT/CN2009/071045 (Jun. 4, 2009).

"ETSI EN 301 931-3—Intelligent Network (IN); Intelligent Network Capability Set 3 (CS3); Intelligent Network Application Protocol (INAP); Protocol specification; Part 3: SCF-SRF interface," Sep. 2001, Version 1.1.2, European Telecommunications Standards Institute, Sopia Antipolis Cedex, France.

Gurbani et al., "Accessing IN services from SIP networks," Internet Engineering Task Force, Aug. 2001, Internet Society, Reston, Virginia.

1st Office Action in corresponding European Patent Application No. 09727763.6 (Jan. 17, 2013).

Znaty et al. "IP Multimedia Subsystem: Principles and Architecture," Jan. 1, 2005, EFORT, Melun, France.

* cited by examiner

METHOD, SYSTEM AND GATEWAY FOR SUPPLYING INTELLIGENT SERVICE

CROSS-REFERENCE TO RELATED APPLICATIONS

This application is a continuation of International Application No. PCT/CN2009/071045, filed on Mar. 27, 2009, which claims priority to Chinese Patent Application No. 200810066226.6, filed on Mar. 29, 2008, both of which are hereby incorporated by reference in their entireties.

FIELD OF THE INVENTION

The present invention relates to communications technologies and in particular to an IP bearer based intelligent service method and system.

BACKGROUND OF THE INVENTION

An increasing number of newly constructed networks emerge along with development and mature of communications technologies, and therefore there is a need of implementing both intercommunication and consolidated development of existing and newly developed networks. The existing networks include, for example, the Public Switched Telephone Network (PSTN) and the Public Land Mobile Network (PLMN). The newly developed networks include, for example, the Next Generation Network (NGN) and the Third Generation (3G) mobile communications network.

The Soft Switch and the Media Gate Way (MGW) implement an Internet Protocol (IP) based bearer in an existing intelligent network implementation solution. Particularly, the soft switch is used to realize signaling processing, call control and service triggering, and the MGW is used to switch a bearer (i.e. a session). An existing traditional narrow-band terminal is still maintained at the user terminal side, that is, the bearer is implemented by way of a Time Division Multiplexing (TDM).

The inventors have found during implementing the invention that an IP bearer is adopted for a core network of a communications network while a narrow-band bearer is adopted for an intelligent network, and thus the different bearers cause complicated management and maintenance of the networks. For example, the different bearers may require a large number of resources to be configured on the MGW, which are intended to perform a bearer switching process, thereby increasing both the investment and configuration complexity. In another example, both the IP and the TDM (e.g. the protocols of E1 and T1) have to be considered for network construction concurrently, so that network construction and both maintenance and management of the networks become more complicated. The introduction of IP realizes all-IP of the core network but a TDM bearer for services is still reserved, and consequently both of the networks have to be maintained and managed concurrently, thereby making it impossible to implement consolidated maintenance and management.

SUMMARY OF THE INVENTION

In view of the above, an Internet Protocol (IP) intelligent service system is provided so as to solve the problem of complicated maintenance and management of a network.

A method for supplying an intelligent service, an intelligent peripheral sub-system and a gateway are also provided.

The method for supplying an intelligent service includes: receiving Internet Protocol based call information transmitted from a switching device, wherein the call information carries service control function identification and call identification; initiating an assistance request to a service control device by the service control function identification and the call identification derived from parsing of the call information; and receiving a resource operation instruction returned from the service control device, and supplying a service-resource service according to the resource operation instruction.

Correspondingly, a system for supplying an intelligent service is further provided. The system includes: an intelligent peripheral sub-system, a switching device and a service control device. The intelligent peripheral sub-system is configured to receive Internet Protocol based call information transmitted from the switching device, initiate an assistance request to the service control device by service control function identification and call identification derived from parsing of the call information, and provide a service-resource service according to a resource operation instruction returned from the service control device. The switching device is configured to communicate with the intelligent peripheral sub-system to perform a service trigger function. The service control device is configured to communicate with the intelligent peripheral sub-system to perform a service control function.

An intelligent peripheral sub-system includes: a first module configured to receive Internet Protocol based call information transmitted from a switching device and parse the call information to derive service control function identification and call identification; a request module configured to initiate an assistance request to the service control device by the service control function identification and the call identification; and a resource capability provision module configured to receive a resource operation instruction returned from the service control device and provide a service-resource service according to the resource operation instruction.

A gateway in communication with an intelligent peripheral device in a time division multiplexing protocol includes one or any combination of: an SIGTRAN application module configured to perform conversion of reception from an intelligent network application protocol over the signaling transport SIGTRAN to the time division multiplexing protocol for subsequent transmission and/or conversion of reception from the time division multiplexing protocol to the intelligent network application protocol over the signaling transport SIGTRAN for subsequent transmission; a first conversion module configured to perform conversion of reception from a call control protocol based on the Internet Protocol to the time division multiplexing protocol for subsequent transmission and/or conversion of reception from the time division multiplexing protocol to the call control protocol based on the Internet Protocol for subsequent transmission; and a second conversion module configured to perform conversion of reception from a media stream transport protocol based on the Internet Protocol to the time division multiplexing protocol for subsequent transmission and/or conversion of reception from the time division multiplexing protocol to the media stream transport protocol based on the Internet Protocol for subsequent transmission.

According to the above intelligent service system, intelligent peripheral sub-system, method for supplying an intelligent service and gateway, a traditional intelligent service may be borne over an IP network and the corresponding service in the original service control device is reserved over the NGN core network. Therefore, the cost of the operator is reduced

DETAILED DESCRIPTION OF THE INVENTION

According to an embodiment of the present invention, a system for supplying an intelligent service includes as follows:

An intelligent peripheral sub-system is capable of communication with a switching device and a service control device. The intelligent peripheral sub-system is configured to receive Internet Protocol-based call information transmitted from the switching device, to initiate an assistance request to the service control device according to service control function identification and call identification derived from parsing of the call information, and to provide a service-resource service according to a resource operation instruction returned from the service control device.

According to another embodiment, a switching device configured to perform a service trigger function, a Service Control Point (SCP) configured to perform service control and a Media Gate Way (MGW) configured to perform bearer switching are further provided in addition to the above intelligent peripheral sub-system. The switching device includes, but not limited to, a Soft Switch, a Service Switching Point (SSP), a Service Switching function Management Entity (SSME), an Intelligent Service Switch (ISS), a Mobile Switching Center (MSC) and any device configured to perform a service trigger function.

According to another embodiment, the intelligent peripheral sub-system and the media gateway communicate in a media stream transport protocol based on the Internet Protocol.

According to another embodiment, the intelligent peripheral sub-system and the service control device communicate in an intelligent network application protocol over the signaling transport SIGTRAN.

Figure 1:
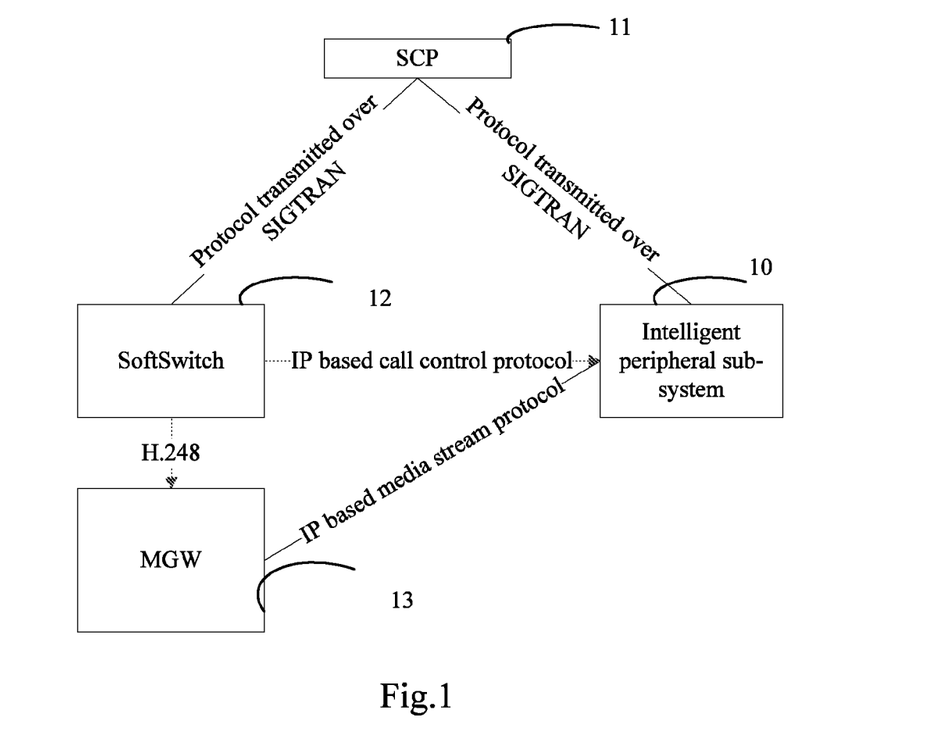
FIG. 1 is a schematic structural diagram of an intelligent network according to an embodiment of the present invention.

Referring to FIG. 1, a schematic network structural diagram of a system for supplying an intelligent service system according to an embodiment is illustrated.

The intelligent service system includes a SoftSwitch 12, an SCP 11, an intelligent peripheral sub-system 10 and an MGW 13. The SoftSwitch 12 is configured to perform a service trigger function. The SCP 11 is configured to perform a service control function. The intelligent peripheral sub-system 10 has the capability to provide resource, e.g. tone playing and digit collecting. The MGW 13 is configured to perform bearer switching.

The intelligent peripheral sub-system 10 and the SoftSwitch 12 communicate in a call control protocol based on the Internet Protocol. Specifically, the call control protocol based on the Internet Protocol may be any Internet Protocol based protocol functioning to control a call between the intelligent peripheral sub-system 10 and the SoftSwitch 12. The call control protocol based on the Internet Protocol includes, but not limited to, the Session Initiation Protocol (SIP), the H.323 protocol, etc. Generally, a call refers to a request for communication between two users or terminals or devices.

According to another embodiment, the SoftSwitch 12 and the SCP 11 may communicate in an intelligent network application protocol over the signaling transport (over SIGTRAN).

The above intelligent network application protocol may vary from one system to another, and for example, may be the Intelligent Network Application Part (INAP) protocol in a fixed intelligent network, the CAMEL Application Part (CAP) protocol in a GSM mobile network, or the Mobile Application Part (MAP) protocol in a CDMA mobile network, etc. All of these protocols may be borne for transmission over the signaling transport (SIGTRAN).

The SoftSwitch 12 and the MGW 13 may communicate in a media gateway control related protocol, e.g. the H.248 protocol or the Media Gateway Control Protocol (MGCP).

The intelligent peripheral sub-system 10 and the SCP 11 may communicate in an intelligent network application protocol over the signaling transport (over SIGTRAN).

The above intelligent network application protocol may vary from one system to another, and for example, may be the Intelligent Network Application Part (INAP) protocol in a fixed intelligent network, the CAP protocol in a GSM mobile network, or the Wireless Intelligent Network (WIN) MAP protocol in a CDMA mobile network, etc. All of these protocols may be borne over the SIGTRAN.

A media stream service (e.g. voice signal) between the intelligent peripheral sub-system 10 and the MGW 13 is communicated in a media stream transport protocol based on the Internet Protocol, e.g. the Real-time Transport Protocol/Real-time Transport Control Protocol (RTP/RTCP).

As can be apparent from the system illustrated in FIG. 1, a TDM bearer, for example, the TDM may be the protocol of E1 or T1, is adopted between traditional intelligent network devices. Unlike a traditional network, the embodiment of the present invention utilizes at least partly a TCP/IP network for a bearer, that is, the signals are transported over the TCP/IP network. This embodiment makes it easier and more convenient to maintain an intelligent service network.

Figure 2:
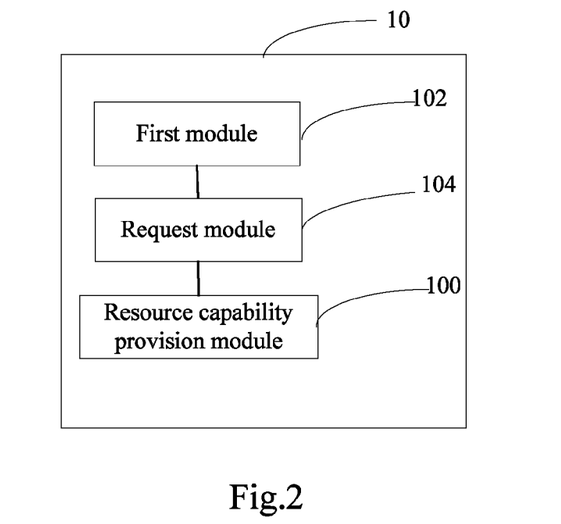
FIG. 2 is a schematic structural diagram of an intelligent peripheral sub-system according to an embodiment of the present invention.

Another embodiment of the present invention provides an intelligent peripheral sub-system. Referring to FIG. 2, a schematic structural diagram of an intelligent peripheral sub-system 10 is illustrated. The sub-system includes: a first module 102, a request module 104, and a resource capability provision module 100.

The first module 102 is configured to receive Internet Protocol-based call information transmitted from a switching device, and to parse the call information to derive service control function identification and call identifier. In other words, the first module 102 may support transmission of signaling of a call control protocol based on the Internet Protocol for a call. For example, the intelligent peripheral sub-system 10 can communicate with the SoftSwitch 12 through SIP signaling or in the H.323 protocol via the first module 102.

The request module 104 is configured to initiate an assistance request to a service control device according to the service control function identification and the call identifier.

The resource capability provision module 100 is configured to receive a resource operation instruction returned from the service control device and provide a service-resource service according to the resource operation instruction. The module performs existing basic functions of an intelligent peripheral device, e.g. tone playing and digit collecting, recording, facsimile, video playing, etc.

Figure 3:
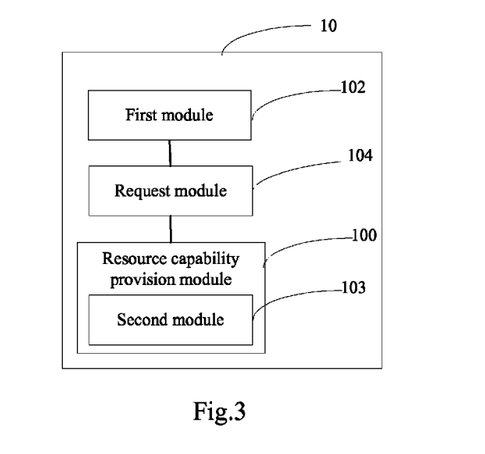
FIG. 3 is a schematic structural diagram of an intelligent peripheral sub-system according to another embodiment of the present invention.

Referring to FIG. 3, a schematic structural diagram of an intelligent sub-system is illustrated according to another embodiment. The intelligent peripheral sub-system may further include a second module 103.

The second module 103 is configured to establish a media stream to a media gateway in a media stream transport protocol based on the Internet Protocol. That is, the second module 103 may support transmission of signaling of the media stream transport protocol for the media stream. For example, the intelligent peripheral device 10 together with the MGW 13 may communicate the media stream in the protocol of RTP/RTCP via the application module 103 of the media stream transport protocol based on the Internet Protocol.

Figure 4:
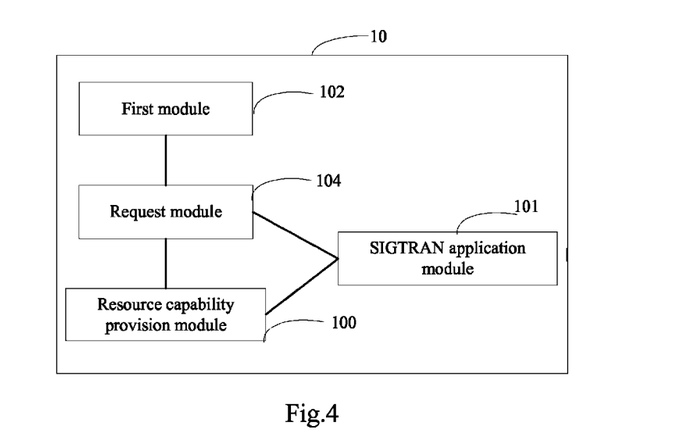
FIG. 4 is a schematic structural diagram of an intelligent peripheral sub-system according to another embodiment of the present invention.

Referring to FIG. 4, another structural form of an intelligent peripheral sub-system is illustrated. Based on the above embodiment, the sub-system may further include a SIGTRAN application module 101.

The SIGTRAN application module 101 is arranged among the request module 104, the resource capability provision module 100 and the service control device and configured to support transmission in an intelligent network application protocol over the signaling transport (SIGTRAN). For example, the intelligent peripheral sub-system 10 may communicate with the SCP 11 in the INAP-over-SIGTRAN protocol via the SIGTRAN application module 101.

Figure 5:
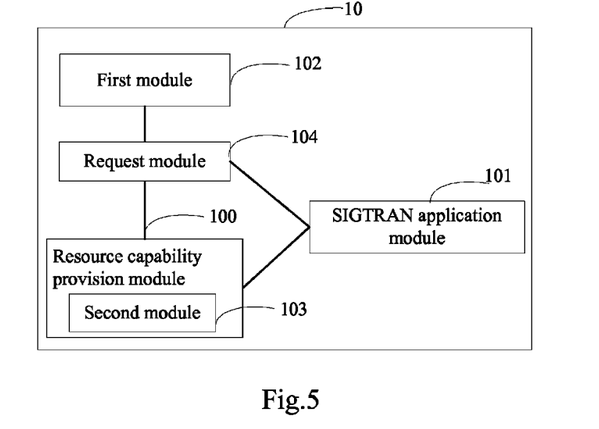
FIG. 5 is a schematic structural diagram of an intelligent peripheral sub-system according to another embodiment of the present invention.

Referring to FIG. 5, the intelligent peripheral sub-system may further include the above second module 103 and SIGTRAN application module 101, and functions of the respective modules have been detailed above and repeated descriptions thereof will be omitted here.

The above SIGTRAN application module 101, first module 102 and second module 103 may be integrated with the request module 104 and the resource capability provision module 100 into a separate intelligent peripheral device. Or the above SIGTRAN application module 101, first module 102 and second module 103 may be gateways separate from the request module 104 and the resource capability provision module 100 respectively. Or the above SIGTRAN application module 101, first module 102 and second module 103 may be integrated arbitrarily into a gateway separate from the request module 104 and the resource capability provision module 100 (equivalent to the original intelligent peripheral device). The above separate gateways communicate with the request module and the resource capability provision module 100 through the existing TDM (e.g. the protocols of E1 and T1). That is, these separate gateways are capable of bidirectional conversion of protocols between an IP based protocol and the TDM.

Figure 6A:
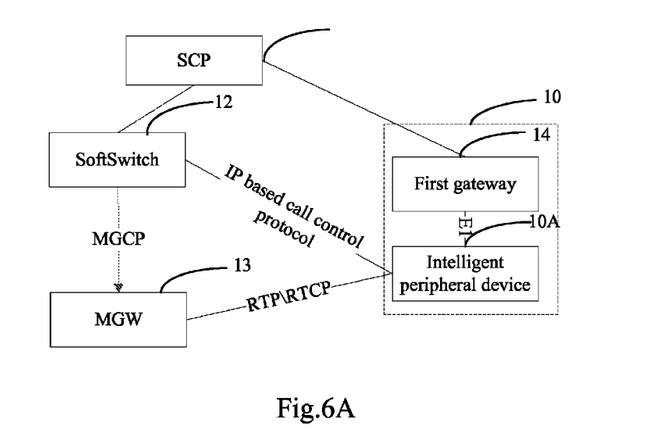
FIG. 6A is a schematic structural diagram of an intelligent network according to another embodiment of the present invention.

Referring to FIG. 6A, a schematic network structural diagram of an intelligent service system based on the Internet Protocol is illustrated. The intelligent peripheral sub-system includes a first gateway 14 and an intelligent peripheral device 10A. The first gateway 14 is configured to support transmission with a service control device in an intelligent network application protocol over the signaling transport (SIGTRAN). The first gateway 14 and the intelligent peripheral device 10A still communicate through the TDM (e.g. the protocols of E1 and T1). That is, the first gateway 14 may perform bidirectional conversion between the TDM transmission protocol and the protocol over the signaling transport SIGTRAN. For example, the intelligent peripheral sub-system 10 may communicate with the SCP 11 in the INAP-over-SIGTRAN protocol via the first gateway 14.

Functions of the other devices (the SCP 11, the SoftSwitch 12 and the MGW 13) in the intelligent service system illustrated in FIG. 6A are similar to those of the homonymous devices in the system illustrated in FIG. 1, and repeated descriptions thereof will be omitted here.

Figure 6B:
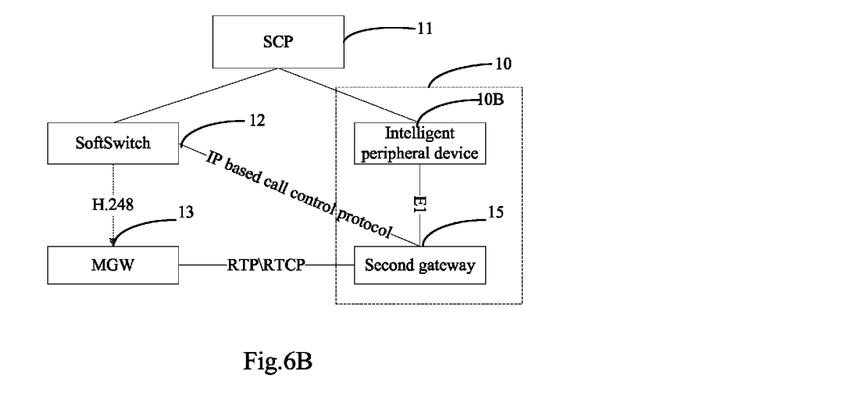
FIG. 6B is a schematic structural diagram of an intelligent network according to another embodiment of the present invention.

Referring to FIG. 6B, a schematic network structural diagram of an intelligent service system based on the Internet Protocol is illustrated.

At least one second gateway 15 is configured to support transmission of signaling of a call control protocol based on the Internet Protocol for a call with a switching device and/or to support signaling of a media stream transport protocol for a media stream with a media gateway. The second gateway 15 and an intelligent peripheral device 10B communicate in the existing E1 protocol, that is, the second gateway 15 may support conversion between the existing TDM (e.g. the protocols of E1 and T1) and the protocol based on the Internet Protocol (e.g. the call control protocol and the media stream transport protocol). For example, the second gateway 15 is configured to communicate over the E1 protocol with the intelligent peripheral device, convert relevant communication into SIP signaling for transmission to the SoftSwitch, and convert relevant SIP signaling transmitted from the SoftSwitch into E1 signaling for transmission to the intelligent peripheral device.

The intelligent peripheral device 10B has capability to provide a resource and may support transmission in an intelligent network application protocol over SIGTRAN. Repeated descriptions thereof will be omitted here.

Functions of the other devices (the SCP 11, the SoftSwitch 12 and the MGW 13) in the intelligent service system illustrated in FIG. 6B are similar to those of the homonymous devices in the system illustrated in FIG. 1, and repeated descriptions thereof will be omitted here.

Figure 6C:
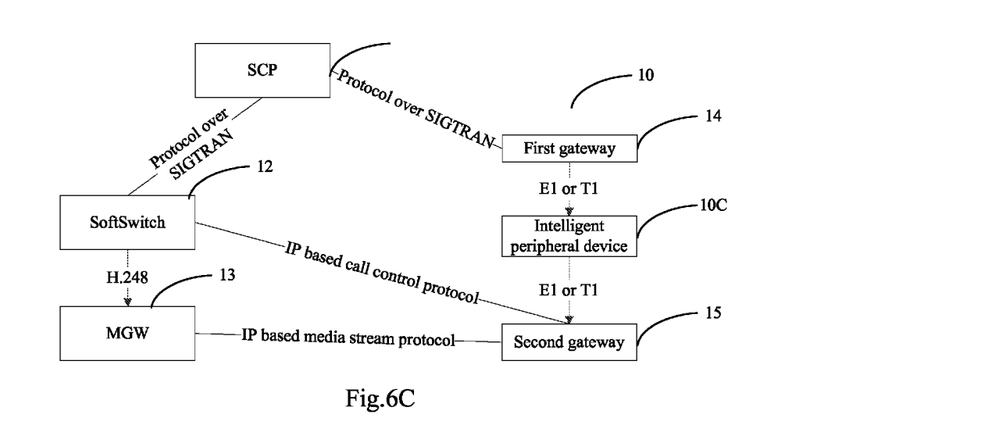
FIG. 6C is a schematic structural diagram of an intelligent network according to another embodiment.

Referring to FIG. 6C, a schematic network structural diagram of an intelligent service system based on the Internet Protocol is illustrated. The intelligent service sub-system includes a first gateway 14, a second gateway 15 and an intelligent peripheral device 10C.

The first gateway 14 is configured to support transmission in an intelligent network application protocol over the signaling transport (SIGTRAN). The first gateway 14 and the intelligent peripheral device 10B still communicate through the TDM (e.g. the protocols of E1 and T1). That is, the first gateway 14 performs conversion from the original TDM transport protocol to the protocol over the signaling transport SIGTRAN for transmission.

The second gateway 15 is configured to support transmission of signaling of a call control protocol based on the Internet Protocol for a call with a switching device and/or to support signaling of a media stream transport protocol based on the Internet Protocol for a media stream with a media gateway. The second gateway 15 and the intelligent peripheral device 10B communicate through the existing TDM (e.g. the protocols of E1 and T1). That is, the second gateway 15 may support conversion between the existing TDM and the protocol based on the Internet Protocol (e.g. the call control protocol and the media stream transport protocol).

An intelligent peripheral device 10 C which is similar to an existing intelligent peripheral device has capability to provide resource, and repeated descriptions thereof will be omitted here.

Functions of the other devices (the SCP 11, the SoftSwitch 12 and the MGW 13) in the intelligent service system illustrated in FIG. 6C are similar to those in the system illustrated in FIG. 1, and repeated descriptions thereof will be omitted here.

Correspondingly, an embodiment of the present invention further provides a gateway applicable in the above system for supplying an intelligent service, e.g. the above first gateway 14 and second gateway 15. The gateway communicates with the intelligent peripheral device through the time division multiplexing and includes: One or any combination of the following modules: a SIGTRAN application module, a first conversion module, and a second conversion module.

The SIGTRAN application module is configured to support mutual conversion between an intelligent network application protocol over the signaling transport SIGTRAN and the time division multiplexing protocol. That is, the SIGTRAN application module is configured to perform conversion of reception from the intelligent network application protocol over the signaling transport SIGTRAN to the time division multiplexing protocol for subsequent transmission and/or perform conversion of reception from the time division multiplexing protocol to the intelligent network application protocol over the signaling transport SIGTRAN for subsequent transmission. Specifically, the above intelligent network application protocol may vary from one system to another, and for example, may be the Intelligent Network Application Part (INAP) protocol in a fixed intelligent network, the CAMEL Application Part (CAP) protocol in a GSM mobile network, or the Mobile Application Part (MAP) protocol in a CDMA mobile network, etc. All of these protocols may be borne for transmission over the signaling transport (SIGTRAN).

The first conversion module is configured to support mutual conversion between a call control protocol based on the Internet Protocol for a call and the time division multiplexing protocol, that is, the first conversion module is configured to perform conversion of reception from the call control protocol based on the Internet Protocol to the time division multiplexing protocol for subsequent transmission and/or perform conversion of reception from the time division multiplexing protocol to the call control protocol based on the Internet Protocol for subsequent transmission. Specifically, the call control protocol based on the Internet Protocol may be any Internet Protocol based protocol functioning to control a call between the intelligent peripheral sub-system 10 and the SoftSwitch 12. The call control protocol based on the Internet Protocol includes, but not limited to, the Session Initiation Protocol (SIP), the H.323 protocol, etc.

The second conversion module is configured to support mutual conversion between a media stream transport protocol based on the Internet Protocol for a media stream and the time division multiplexing protocol. That is, the second conversion module is configured to perform conversion of reception from the media stream transport protocol based on the Internet Protocol to the time division multiplexing protocol for subsequent transmission and/or perform conversion of reception from the time division multiplexing protocol to the media stream transport protocol based on the Internet Protocol for subsequent transmission. Specifically, the media stream transport protocol based on the Internet Protocol includes, for example, the H.248 protocol or the Media Gateway Control Protocol (MGCP).

The above gateway, which is applicable for supplying an intelligent service system, may be utilized in combination with an intelligent peripheral device, so that the intelligent peripheral device may adopt an Internet Protocol (IP) bearer to thereby simplify management and maintenance throughout the communication network.

The above respective embodiments are merely illustrative but not limitative to the invented solutions, and those skilled in the art may make equivalent alternatives and modifications without departing from the principle of the invention. For example, a different number of gateways separate from and a different number of internal modules of the intelligent peripheral device may be arranged to cooperate in supporting transmission of signaling of the above different protocols. In another example, different specific intelligent network communication protocols may be adopted for different communication systems. These equivalent alternatives will not depart from the spirit of the invention.

The above call information based on the Internet Protocol (borne over the call control protocol based on the Internet Protocol) carries Service Control Function Identification (SCF ID) and Correlation Identification (Correlation ID), wherein the SCF ID identifies an SCF process and the Correlation ID identifies a call instance.

The above an intelligent service system and intelligent peripheral sub-system (device) as well as gateway in cooperative use therewith have the following advantageous effects: the SCF ID and the Correlation ID need to be carried when a Service Switching Point (SSP) initiates a call to the intelligent peripheral sub-system 10 in a traditional PSTN network, furthermore, signaling of the protocol based on the Internet Protocol carries the SCF ID and the Correlation ID in the above respective embodiments. Thus during provision of an intelligent service, the above respective embodiments may adopt an Internet Protocol (IP) bearer to simplify management and maintenance throughout the communication network on one hand and satisfy a logic relationship between a switching device (e.g. the SSP) in the traditional PSTN network and the intelligent peripheral device on the other hand, so that a service over the traditional PSTN may be reserved and implemented without any influence upon a user's experience of the service.

Figure 7:
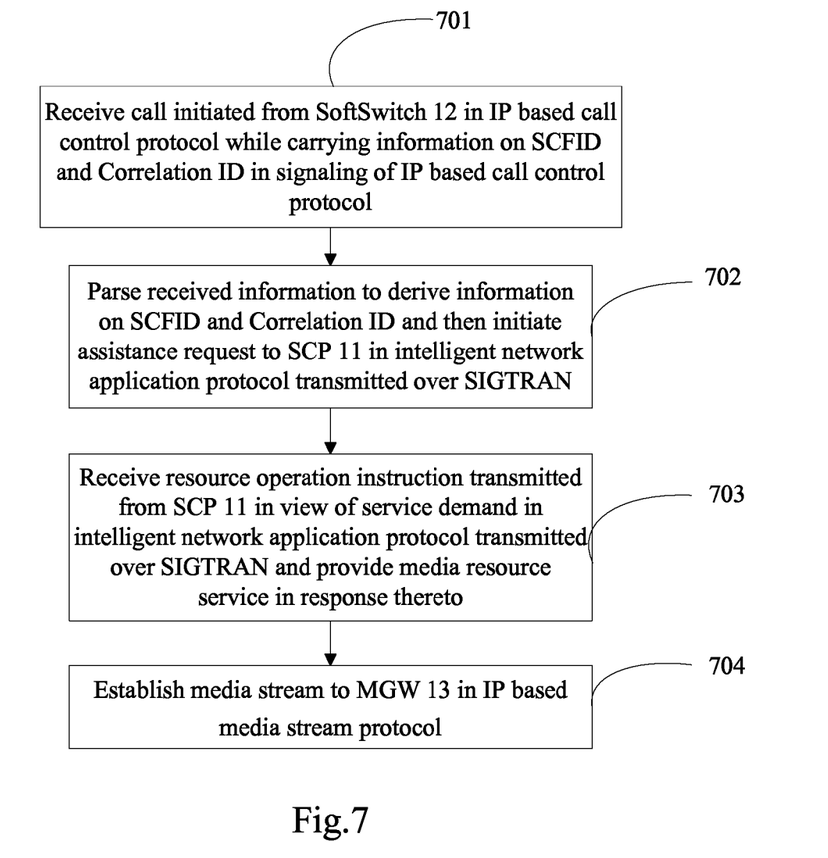
FIG. 7 is a flow chart of a method for supplying an intelligent service according to another embodiment of the present invention.

Another embodiment further provides a method for supplying an intelligent service while the intelligent service system operates. Referring to FIG. 7, a flow chart of the method is illustrated with the following flow:

Upon a request for and prior to provision of an intelligent service, the SoftSwitch 12 analyzes and triggers the intelligent service to the SCP 11, and the SCP 11 parses the intelligent service and then instructs the SoftSwitch 12 to establish a temporary connection to the intelligent peripheral sub-system when the SoftSwitch 12 receives a request of the intelligent service.

The intelligent peripheral sub-system here refers to the intelligent peripheral sub-system in the above systems, and repeated descriptions of the different scenarios will be omitted here.

Step 701: The intelligent peripheral sub-system receives a call from the SoftSwitch 12, wherein the call is initiated in a call control protocol based on the Internet Protocol and SCF ID and Correlation ID are carried in signaling of the call control protocol based on the Internet Protocol.

The protocol based on the Internet Protocol includes, but not limited to, the SIP protocol and the H.323 protocol.

The SCF ID and the Correlation ID may be carried variously in SIP signaling taking the SIP protocol as an example.

In some embodiments, when the intelligent peripheral sub-system is consisted of one or more separate gateways and an intelligent peripheral device, the one or more separate gateways may perform mutual conversion between a call control protocol borne over the time division multiplexing and the call control protocol based on the Internet Protocol, and/or perform mutual conversion between a media stream transport protocol borne over the time division multiplexing and the media stream transport protocol based on the Internet Protocol.

Step 702: The intelligent peripheral sub-system parses the received information to derive the SCF ID and the Correlation ID, and then initiates an assistance request to the SCP in an intelligent network application protocol transmitted over the SIGTRAN. The intelligent network application protocol may include, for example, the INAP protocol in a fixed intelligent network, the CAP protocol in a GSM mobile network, or the WIN MAP protocol in a CDMA mobile network, etc.

Step 703: The intelligent peripheral sub-system receives a resource operation instruction and provides a media resource service according to the resource operation instruction. According to a service request, the resource operation instruction is transmitted from the SCP in the intelligent network application protocol transmitted over the SIGTRAN, for example, the INAP protocol in a fixed intelligent network, the CAP protocol in a GSM mobile network, or the WIN MAP protocol in a CDMA mobile network, etc. The intelligent peripheral device may further report an operation execution result of the intelligent peripheral device to the SCP 11 through SIGTRAN transmission. This process may repeat for several times in a practical communication process.

The media resource service includes:

Step 704: The intelligent peripheral sub-system establishes a media stream to the MGW in the media stream protocol based on the Internet Protocol, e.g. the RTP/RTCP protocol.

The method may further include: reporting a user event to the SCP 11 when the SoftSwitch 12 detects the event and performing subsequent operations as instructed by the SCP 11. For example, the SoftSwitch 12 reports the hang-up event to the SCP 11 and releases the previous call to the intelligent peripheral device 10 as instructed by the SCP 11 when the SoftSwitch 12 detects hanging-up by the user.

The signaling of the protocol based on the Internet Protocol carries service control function identification (SCF ID) and call identifier (Correlation ID) in the above method, where the SCF ID identifies a Service Control Function (SCF) process, and the Correlation ID identifies a call instance.

In the above method for supplying an intelligent service, the intelligent peripheral device may communicate with the outside through signaling based on the Internet Protocol, e.g. the switching device, the service control device and the media gateway(s). Thus the above method for supplying an intelligent service may adopt the protocol consistent with the part of the core network (the Internet Protocol) during provision of an intelligent service to thereby reduce signaling, simplify management and maintenance of the network and to also reserve an intelligent service in the original traditional network without any influence upon the existing intelligent service.

Different flows for supplying an intelligent service in connection with different ways of carrying the SCF ID and the Correlation ID through the SIP signaling will be introduced below considering an example in which the protocol based on the Internet Protocol is the SIP protocol, the intelligent network application protocol transmitted over the SIGTRAN is the INAP over SIGTRAN, and the media stream protocol is the RTP/RTCP protocol.

Figure 8:
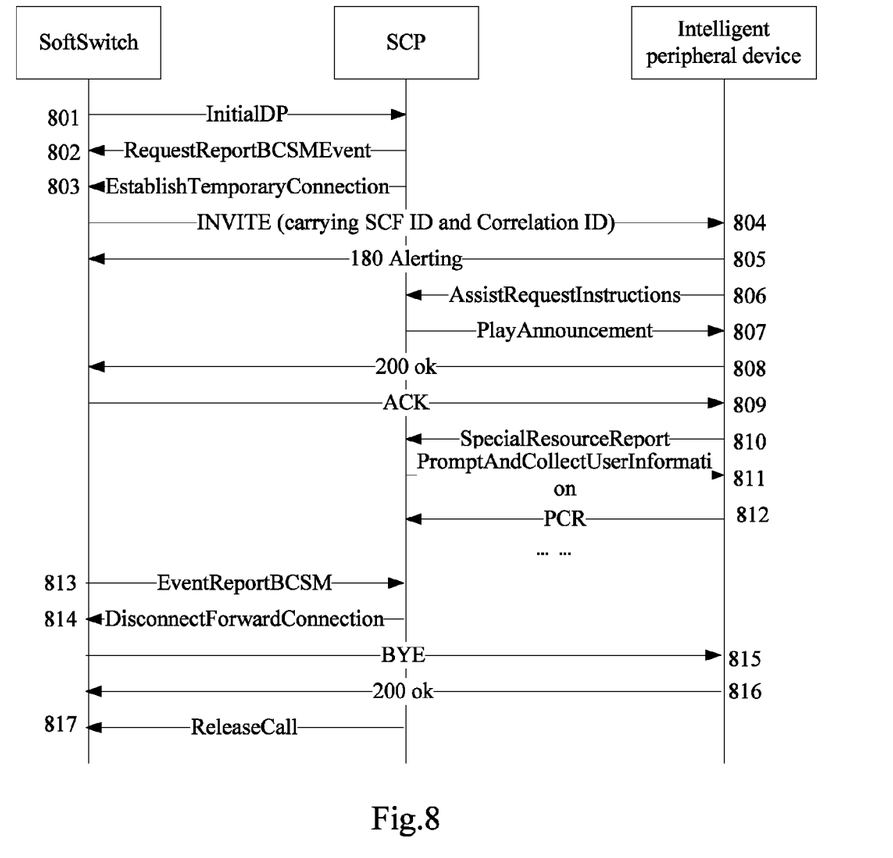
FIG. 8 is a flow chart of signaling for supplying an intelligent service according to another embodiment of the present invention.

In a method for supplying an intelligent service, the SCF ID and Correlation ID are carried in a message of INVITE. Referring to FIG. 8, a flow chart of specific signaling of the method for supplying an intelligent service while carrying the SCF ID and Correlation ID in a message of INVITE is illustrated. The method includes the following steps:

801: The SoftSwitch transmits a message of Initial DP to the SCP.

802: The SCP transmits a message of Request Report BCSM Event to the SoftSwitch.

803: The SCP transmits a message of Establish Temporary Connection to the SoftSwitch.

In 801-803 above, the SoftSwitch analyzes and triggers an intelligent service to the SCP, and the SCP parses the intelligent service and then instructs the SoftSwitch to establish a temporary connection to the intelligent peripheral device.

804: The SoftSwitch transmits a message of INVITE to the intelligent peripheral device, wherein the message of INVITE carries SCF ID and Correlation ID.

805: The intelligent peripheral device transmits a message of 180 Alerting to the SoftSwitch.

In the 804-805 above, the intelligent peripheral device receives a call initiated from the SoftSwitch in the call control protocol based on the Internet Protocol while carrying the SCF ID and the Correlation ID in the message of INVITE.

806: The intelligent peripheral device transmits a message of Assist Request Instruction to the SCP.

In the 806 above, the intelligent peripheral device parses the received the message of INVITE to derive the SCF ID and the Correlation ID, and then transmits an assistance request to the SCP in the intelligent network application protocol transmitted over the SIGTRAN.

807: The SCP transmits a message of Play Announcement to the intelligent peripheral device.

808: The intelligent peripheral device transmits a message of 200 OK to the SoftSwitch.

809: The SoftSwitch returns a message of ACK to the intelligent peripheral device.

810: The intelligent peripheral device transmits a message of Special Resource Report to the SCP.

811: The SCP transmits a message of Prompt and Collect User Information to the intelligent peripheral device.

812: The intelligent peripheral device transmits a message of PCR (i.e. a message of Prompt and Collect User Information Respond) to the SCP.

In 807-812 above, the intelligent peripheral device receives a resource operation instruction and provides a media resource service in response thereto. The resource operation instruction is transmitted from the SCP in view of a service demand and in the intelligent network application protocol transmitted over the SIGTRAN.

The method may further include:

813: The SoftSwitch transmits a message of EventReport-BCSM to the SCP.

814: The SCP returns a message of DisconnectForwardConnection to the SoftSwitch.

815: The SoftSwitch transmits a message of BYE to the intelligent peripheral device.

816: The intelligent peripheral device returns a message of 200 OK to the SoftSwitch.

817: The SCP transmits a message of Release Call to the SoftSwitch.

In 813-817 above, the SoftSwitch reports the hang-up event to the SCP and releases the previous call to the intelligent peripheral device in response to an instruction of the SCP when the SoftSwitch 12 detects hanging-up by a user.

Through the above signaling interaction, the intelligent peripheral device may parse the message of INVITE to derive the SCF ID and the Correlation ID when the intelligent peripheral device receives the message of INVITE, and hereupon finish and terminate provision of the intelligent service.

In the signaling interaction process illustrated in FIG. 8, the SoftSwitch and the SCP interact in the protocol transmitted over the SIGTRAN (i.e. signaling), the intelligent peripheral device and the SoftSwitch interact in the SIP protocol (i.e. signaling), and the intelligent peripheral device and the SCP interact in the protocol transmitted over the SIGTRAN (i.e. signaling).

The SCF ID and Correlation ID may be carried variously in a message of INVITE.

In a specific way of carrying the SCF ID and the Correlation ID in the message of INVITE, a called number in the message of INVITE carries the SCF ID and the Correlation ID. Specifically, a routing number of the intelligent peripheral device may firstly be placed in the called number in the message of INVITE, and the SCF ID and the Correlation ID are appended to the routing number of the intelligent peripheral device in the embodiment of the present invention. An order about the SCF ID and the Correlation ID is arranged and the number of bits thereof may be determined from a configuration or from a specific combination of end characters (e.g. E0).

In another specific way of carrying the SCF ID and the Correlation ID in the message of INVITE, the SCF ID and the Correlation ID are carried in an SIP message head field of the message of INVITE. Specifically, a definition of the head field of the SIP message is extended to carry the SCF ID and the Correlation ID, and the SCF ID and the Correlation ID are carried in the message of INVITE initiated from the SoftSwitch 12 to the intelligent peripheral device. A specific example is as follows:

INVITE sip: . . .
Via: . . .
Max-Forwards: . . .
To: . . .
From: . . .
Call-ID: . . .
SCF ID: 1234
CORRELATION ID: 456789
CSeq: . . .
Subject: . . .
Contact: . . .
Content-Type: . . .
Content-Length: . . .

In a further specific way of carrying the SCF ID and the Correlation ID in the message of INVITE, the SCF ID and the Correlation ID are carried in an SIP message body of the INVITE message. Specifically, both Content-Type and contents of an SIP signaling message body are defined and carried in the message of INVITE initiated from the SoftSwitch to the intelligent peripheral device, for example, Content-Type: application\pstnin, SCF ID=XXXXXXXXX, and CORRELATION ID=XXXXXXX.

In the above ways of carrying the SCF ID and the Correlation ID in the message of INVITE, the intelligent peripheral device may be enabled to provide a service in the original traditional network in the IP based protocol on one hand, neither redundant signaling nor the number of steps for supplying an intelligent service will be increased on the other hand, thereby optimizing the flow for supplying an intelligent service and reducing a load of the communication network.

Figure 9:
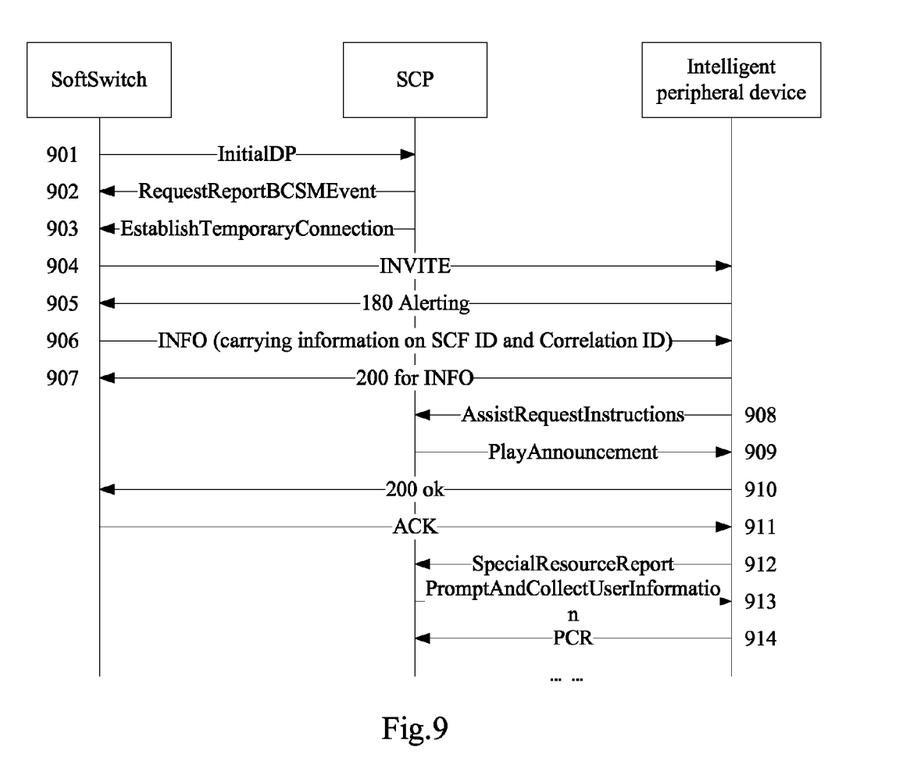
FIG. 9 is a flow chart of signaling for supplying an intelligent service according to another embodiment of the present invention.

In addition to the ways carrying SCF ID and Correlation ID in the message of INVITE, another carrying method is to carry SCF ID and Correlation ID in a separate message of INFO. Referring to FIG. 9, a flow chart of specific signaling of a method for supplying an intelligent service while carrying SCF ID and Correlation ID in a message of INFO is illustrated. The method includes the following steps:

901. The SoftSwitch transmits a message of Initial DP to the SCP.

902: The SCP transmits a message of Request Report BCSM Event to the SoftSwitch.

903: The SCP transmits a message of Establish Temporary Connection to the SoftSwitch.

In 901-903 above, the SoftSwitch analyzes and triggers an intelligent service to the SCP, and the SCP parses the intelligent service and then instructs the SoftSwitch to establish a temporary connection to the intelligent peripheral device.

904: The SoftSwitch transmits a message of INVITE to the intelligent peripheral device. Unlike the previous embodiment, the message of INVITE carries no the SCF ID and Correlation ID in the present embodiment of the present invention.

905: The intelligent peripheral device transmits a message of 180 Alerting to the SoftSwitch.

906: The SoftSwitch transmits a message of INFO to the intelligent peripheral device, wherein the message of INFO carries SCF ID and Correlation ID.

907: The intelligent peripheral device transmits a message of 200 For INFO to the SoftSwitch.

In 904-907 above, the intelligent peripheral device receives a call initiated from the SoftSwitch in the call control protocol based on the Internet Protocol while carrying the SCF ID and the Correlation ID in the message of INFO.

908: The intelligent peripheral device transmits a message of Assist Request Instruction to the SCP.

In 908 above, the intelligent peripheral device parses the received information to derive the SCF ID and the Correlation ID, and then transmits an assistance request to the SCP in the intelligent network application protocol transmitted over the SIGTRAN.

909: The SCP transmits a message of Play Announcement to the intelligent peripheral device.

910: The intelligent peripheral device transmits a message of 200 OK to the SoftSwitch.

911: The SoftSwitch returns a message of ACK to the intelligent peripheral device.

912: The intelligent peripheral device transmits a message of Special Resource Report to the SCP.

913: The SCP transmits a message of Prompt and Collect User Information to the intelligent peripheral device.

914: The intelligent peripheral device transmits a message of PCR (i.e. a message of Prompt and Collect User Information Respond) to the SCP.

In 909-914 above, the intelligent peripheral device receives a resource operation instruction and provides a media resource service in response thereto. The resource operation instruction is transmitted from the SCP in view of a service demand and in the intelligent network application protocol transmitted over the SIGTRAN.

In the signaling interaction process illustrated in FIG. 9, the SoftSwitch and the SCP interact in the protocol transmitted over the SIGTRAN (i.e. signaling), the intelligent peripheral device and the SoftSwitch interact in the SIP protocol (i.e. signaling), and the intelligent peripheral device and the SCP interact in the protocol transmitted over the SIGTRAN (i.e. signaling).

SCF ID and Correlation ID may also be carried in a message of INFO in different scenarios. In one scenario, the SCF ID and Correlation ID may be carried in a definition-extended head filed of the message of INFO. This scenario is similar to carrying it in the head field of the message of INVITE, and repeated descriptions thereof will be omitted here. In another scenario, the SCF ID and Correlation ID may be carried in a message body of the message of INFO. This scenario is similar to carrying it in a message body of the message of INVITE, and repeated descriptions thereof will be omitted here.

Through the above signaling interaction, the intelligent peripheral device may parse the message of INFO (e.g. in the head field or the message body) to derive the SCF ID and the Correlation ID when the intelligent peripheral device receives the message of INFO, and hereupon finish and terminate provision of the intelligent service.

When the protocol based on the Internet Protocol is the H.323 protocol, the H.323 protocol also carries SCF ID and Correlation ID. A specific carrying method thereof is similar to SIP signaling, and repeated descriptions thereof will be omitted here.

In the respective embodiments, an advantageous effect of carrying information on SCF ID and Correlation ID lies in that the SSP needs SCF ID and Correlation ID when the SSP initiates a call to the intelligent peripheral device in a traditional PSTN network, wherein the SCF ID and Correlation ID may be carried in the SIP signaling. Furthermore, a logic relationship between the SSP and the intelligent peripheral device in the traditional PSTN network can be maintained between the SoftSwitch 12 and the intelligent peripheral device to thereby reduce building complexity of the network evolving to be all-IP.

According to the above intelligent service system, intelligent service method, intelligent peripheral device and gateway, a traditional intelligent service may be borne over an IP network, and the original SCP and the corresponding service over the NGN core network may be reserved. Thus, the above intelligent service system, intelligent service method, intelligent peripheral device and gateway may save an investment of the operator and keep an end user's experience of the service unchanged, thereby simplifying management and maintenance of the network.

From the foregoing descriptions of the embodiments, those skilled in the art may clearly appreciate that the invention may be implemented with software plus a general purpose hardware platform or of course may be implemented with hardware, although the former is a preferred embodiment in many cases. Based on such understanding, the essence of the technical solution of the invention or a contribution thereof to the prior art may be embodied in the form of a software product stored in a storage medium, which may include several instructions to make a computer device (which may be a personal computer, a server, a network device, etc.) perform the methods according to the respective embodiments of the invention.

The foregoing descriptions are merely illustrative of the preferred embodiments of the invention, but the scope of the invention will not be limited to such embodiments. Any variations or alternatives which can readily occur to those skilled in the art without departing from the disclosure of the invention shall be encompassed in the scope of the invention. Accordingly, the scope of the invention shall be defined as in the appended claims.

The invention claimed is:

1. A method for supplying an intelligent service in an intelligent service system, comprising:

receiving, by an intelligent peripheral subsystem, Internet Protocol, IP, based call information transmitted from a switching device, wherein the call information carries service control function identification and call identification in a Session Initiation Protocol, SIP, INVITE message or in a SIP INFO message, wherein the intelligent service system comprises the switching device, the Intelligent peripheral subsystem and a service control device, and wherein the switching device, the Intelligent peripheral subsystem and the service control device in the intelligent service system communicate with each other based on the IP, and both the switching device and the Intelligent peripheral subsystem communicate with a Media Gate Way, MGW, also based on the IP;

initiating, by the intelligent peripheral subsystem, an assistance request to a service control device by the service control function identification and the call identification derived from parsing of the IP based call information;

receiving, by the intelligent peripheral subsystem, a resource operation instruction returned from the service control device; and supplying, by the intelligent peripheral subsystem, a service-resource service according to the resource operation instruction;

wherein the initiating the assistance request to the service control device or the receiving the resource operation instruction returned from the service control device is based on an intelligent network application protocol transmitted over the signaling transport (SIGTRAN), and the switching device communicates with the service control device in an intelligent network application protocol over the signaling transport (over SIGTRAN), wherein when the IP based call information is call information based on the SIP, and wherein:

the service control function identification and the call identification is carried in a called number, a message head field or a message body in the SIP INVITE message; or the service control function identification and the call identification is carried in a message head field or a message body in the SIP INFO message.

2. The method according to claim 1, wherein the supplying the service-resource service comprises:

establishing a media stream to a media gateway in a media stream transport protocol based on the IP.

3. The method according to claim 1, further comprising:

converting the Internet Protocol based call information into call information borne through time division multiplexing.

4. A system for supplying an intelligent service, comprising:

an intelligent peripheral sub-system,
a switching device, and
a service control device,
wherein:
the switching device, the Intelligent peripheral subsystem, and the service control device in the intelligent service system communicate with each other based on Internet Protocol, IP, and both the switching device and the Intelligent peripheral subsystem communicate with a Media Gate Way, MGW, also based on the IP;

the intelligent peripheral sub-system is configured to receive IP based call information transmitted from the switching device, initiate an assistance request to the service control device by service control function identification and call identification derived from parsing of the call information, wherein the call information carries service control function identification and call identification in a Session Initiation Protocol, SIP, INVITE message or in a SIP INFO message, and provide a service-resource service according to a resource operation instruction returned from the service control device;

the switching device is configured to communicate with the intelligent peripheral sub-system to perform a service trigger function; and communicate with the service control device in an intelligent network application protocol over the signaling transport (over SIGTRAN); and the service control device is configured to communicate with the intelligent peripheral sub-system to perform a service control function, wherein when the IP based call information is call information based on the SIP, and wherein:

the service control function identification and the call identification is carried in a called number, a message head field or a message body in the SIP INVITE message; or the service control function identification and the call identification is carried in a message head field or a message body in the SIP INFO message.

5. The system according to claim 4, further comprising:
a media gateway configured to perform bearer switching; wherein the intelligent peripheral sub-system and the media gateway communicate in a media stream transport protocol based on the IP.

6. The system according to claim 4, wherein the intelligent peripheral sub-system and the service control device communicate in an intelligent network application protocol transmitted over the signaling transport SIGTRAN.

7. An intelligent peripheral sub-system, in communication with a Media Gate Way, MGW, based on Internet Protocol, IP, comprising a tangible non-transient computer-readable medium and a processor for executing instructions stored on the computer-readable medium, the computer-readable medium further comprising:

a first module configured to receive, IP based call information transmitted from a switching device and parse the IP based call information to derive service control function identification and call identification, wherein the IP based call information carries service control function identification and call identification in a Session Initiation Protocol, SIP, INVITE message or in a SIP INFO message, wherein the intelligent peripheral sub-system and the switching device communicate with each other based on the IP;

a request module configured to initiate an assistance request to a service control device by the service control function identification and the call identification, wherein the intelligent peripheral sub-system and the service control device communicate with each other based on the IP; and a resource capability provision module configured to receive a resource operation instruction returned from the service control device and provide a service-resource service according to the resource operation instruction;

wherein the switching device communicates with the service control device in an intelligent network application protocol over the signaling transport (over SIGTRAN), and wherein when the IP based call information is call information based on the SIP, and wherein:

the service control function identification and the call identification is carried in a called number, a message head field or a message body in the SIP INVITE message; or the service control function identification and the call identification is carried in a message head field or a message body in the SIP INFO message.

8. The sub-system according to claim 7, further comprising:
a second module configured to establish a media stream to a media gateway in a media stream transport protocol based on the Internet Protocol.

9. The sub-system according to claim 7, further comprising:
at least one signaling transport (SIGTRAN) application modules configured to support an intelligent network application protocol transmitted over the signaling transport SIGTRAN between the request module and the service control device and between the resource capability provision module and the service control device.

10. The sub-system according to claim 8, wherein:
the at least one of the SIGTRAN application modules, the first module and the second module, are in communication with the request module and the resource capability provision module communicate in a time division multiplexing protocol and are integrated into a single entity.

11. The sub-system according to claim 9, wherein:
the at least one of the SIGTRAN application modules, the first module and the second module, are in communication with the request module and the resource capability provision module communicate in a time division multiplexing protocol and are integrated into a single entity.

12. The sub-system according to claim 8, wherein:
the at least one of the SIGTRAN application modules, the first module and the second module constitutes one or more gateways in communication with the request module and the resource capability provision module communicate in a time division multiplexing protocol.

13. The sub-system according to claim 9, wherein:
the at least one of the SIGTRAN application modules, the first module and the second module constitutes one or more gateways in communication with the request module and the resource capability provision module communicate in a time division multiplexing protocol.

* * * * *